(12) United States Patent
Wagner et al.

(10) Patent No.: US 7,023,789 B2
(45) Date of Patent: Apr. 4, 2006

(54) PLAYBACK DEVICE AND STORAGE MEDIUM FOR SELECTIVE STORAGE OF DATA AS A FUNCTION OF DATA COMPRESSION METHOD

(75) Inventors: Oliver Wagner, Hildesheim (DE); Werner Hatscher, Sibbesse (DE); Ansgar Debertin, Holle (DE)

(73) Assignee: Robert Bosch GmbH, Stuttgart (DE)

( * ) Notice: Subject to any disclaimer, the term of this patent is extended or adjusted under 35 U.S.C. 154(b) by 428 days.

(21) Appl. No.: 10/168,891

(22) PCT Filed: Dec. 19, 2000

(86) PCT No.: PCT/DE00/04517

§ 371 (c)(1),
(2), (4) Date: Oct. 24, 2002

(87) PCT Pub. No.: WO01/46951

PCT Pub. Date: Jun. 28, 2001

(65) Prior Publication Data

US 2003/0128648 A1 Jul. 10, 2003

(30) Foreign Application Priority Data

Dec. 21, 1999 (DE) .............................. 199 61 593
Aug. 16, 2000 (DE) .............................. 100 39 771

(51) Int. Cl.
*G11B 7/005* (2006.01)

(52) U.S. Cl. ............................................. 369/124.06

(58) Field of Classification Search ........... 369/124.06, 369/47.32, 47.34, 59.13, 59.14
See application file for complete search history.

(56) References Cited

U.S. PATENT DOCUMENTS

| 5,343,452 | A | * | 8/1994 | Maeda et al. ............. 369/59.26 |
| 5,546,369 | A | * | 8/1996 | Lee et al. ................. 369/47.18 |
| 5,555,229 | A | * | 9/1996 | Kojima et al. ......... 369/124.06 |
| 5,689,486 | A | | 11/1997 | Shimizu et al. |
| 5,859,815 | A | * | 1/1999 | Inoue et al. ............. 369/30.09 |
| 6,111,845 | A | * | 8/2000 | Shyu ...................... 369/124.08 |
| 6,160,788 | A | * | 12/2000 | Kobayashi et al. ...... 369/275.1 |
| 6,272,088 | B1 | * | 8/2001 | Aramaki et al. ......... 369/53.24 |
| 6,332,175 | B1 | * | 12/2001 | Birrell et al. ............ 369/30.23 |

FOREIGN PATENT DOCUMENTS

| DE | 296 19 764 | 1/1997 |
| DE | 199 07 711 | 8/2000 |
| EP | 0 851 423 | 7/1998 |
| EP | 0 999 549 | 5/2000 |
| GB | 2 344 925 | 6/2000 |

(Continued)

*Primary Examiner*—Brian E. Miller
*Assistant Examiner*—Peter Vincent Agustin
(74) *Attorney, Agent, or Firm*—Kenyon & Kenyon

(57) ABSTRACT

A playback device and a storage medium for storing audio data make it possible to increase the audio data volume that may be stored on such a storage medium without increasing the data density. To this end, the audio data compressed according to at least one compression method is stored on the storage medium. The playback device includes a drive for storage media and a scanning device for audio data recorded on a storage medium inserted into the drive. The playback device furthermore includes a control that checks whether the data read is compressed. The playback device furthermore includes a decompression device that performs decompression of the audio data if the audio data is compressed.

8 Claims, 2 Drawing Sheets

FOREIGN PATENT DOCUMENTS

| | | |
|---|---|---|
| HU | 213 963 | 11/1997 |
| HU | 219 498 | 4/2001 |
| JP | 07 272402 | 10/1995 |
| JP | 09 185868 | 7/1997 |
| WO | WO 97 22120 | 6/1997 |
| WO | WO 99 28910 | 6/1999 |

* cited by examiner

PLAYBACK DEVICE AND STORAGE MEDIUM FOR SELECTIVE STORAGE OF DATA AS A FUNCTION OF DATA COMPRESSION METHOD

FIELD OF THE INVENTION

The present invention relates to a playback device and a storage medium.

BACKGROUND INFORMATION

Storage media in the form of audio CDs (compact disks), on which audio data is stored, are conventional. Furthermore, playback devices in the form of audio CD players are conventional, each of which include a drive for playing audio CDs and an optical read head for reading audio data recorded on an audio CD inserted into the drive.

SUMMARY OF THE INVENTION

The playback device according to the present invention and the storage medium according to the present invention may provide the advantage that the audio data may be stored on the storage medium in compressed form according to at least one compression method, and that the playback device includes a control, which examines whether the audio data read from the storage medium inserted into the drive is compressed, the playback device including a decompression device, which performs a decompression of the audio data if the audio data is compressed. In this manner, the capacity of a storage medium for storing audio data, for example of an audio CD, may be greatly increased without having to enlarge the recording or writing density of the audio data on the storage medium. In this manner, conventional methods for the manufacture of storage media for audio data may be maintained despite increased storage capacity for the audio data. Moreover, the recording length for such a storage medium may be extended considerably.

It may be advantageous that the control determines the type of compression of the audio data and that the decompression device decompresses the audio data depending on the type of compression determined. In this manner, it may be possible to implement a playback device for storage media with compressed audio data that offers decompression for various types of audio data compression and is consequently versatile.

A further advantage may be that the playback device includes a memory, in which the control stores the audio data of the storage medium read by the scanning device and detected as compressed before it is relayed on to the decompression device. In this manner, it may be possible to achieve buffering of the compressed audio data read, which is necessary in order to adapt an adjustment of the audio data volume read from the storage medium per time unit to an audio data volume per time unit required for the further processing, for example, for acoustic playback of the audio data.

A further advantage may be that the control, upon detecting compressed audio data, causes the scanning device to read the audio data in portions, e.g., track by track, from the storage medium. In this manner, overflow of the memory is prevented since, due to the compression of the audio data, the audio data volume read per time unit is greater than the audio data volume per time unit necessary for the further processing of the audio data.

A further advantage may be that the control, upon detecting uncompressed audio data of the scanned storage medium, feeds this audio data directly or via a digital/analog converter, e.g., for relaying to a playback arrangement. In this manner, the playback device is also usable for playing back storage media with uncompressed audio data and is consequently even more versatile.

An example embodiment of the present invention is illustrated in the drawings and is explained in greater detail in the following description.

DETAILED DESCRIPTION

Figure 1:
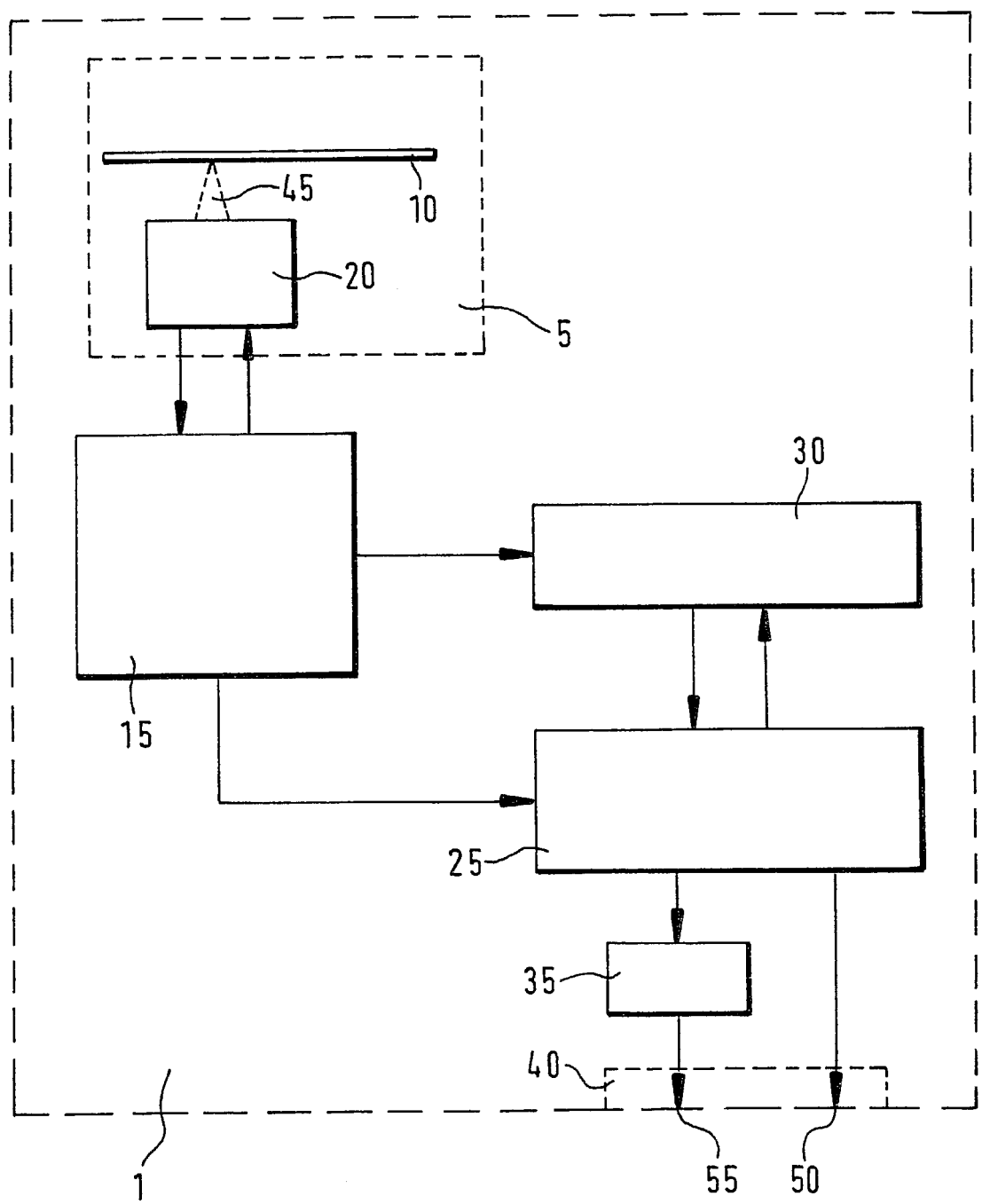
FIG. 1 illustrates a block diagram of a playback device according to the present invention.

FIG. 1 illustrates a playback device 1 for playing back storage media 10 having audio data recorded on storage media 10. Storage media 10 may, for example, be optical and/or magnetic storage media, in which the audio data is optically and/or magnetically recorded. Playback device 1 furthermore includes a drive 5 into which such a storage medium 10 may be inserted. Drive 5 includes a scanning device 20 for reading audio data recorded on the storage medium 10 inserted into drive 5. Drive 5 may, for example, be an optical and/or magnetic drive, depending on whether the audio data is optically or magnetically stored on storage medium 10. Scanning and reading of the audio data of storage medium 10 occurs optically or magnetically as appropriate through scanning device 20. If drive 5 is an optical drive with optical scanning device 20, playback device 1 may, for example, be implemented as an audio CD player for playing back storage media 10 configured in the form of audio CDs. If drive 5 is a magnetic drive with a magnetic scanning device 20, playback device 1 may in this case be configured, for example, as a cassette recorder for playing back storage media 10 configured in the form of audio cassettes. These audio cassettes may be analog or digital recording media.

In the following description, it is assumed, for example, that playback device 1 is configured as an audio CD player. Scanning device 20 is then configured for optical scanning and reading a storage medium 10 in the form of an audio CD using a laser beam 45. In this case, drive 5 may be described as an optical drive. On audio CD 10, the audio data is stored in tracks concentrically to a center of the audio CD 10 and is read by scanning device 20 using laser beam 45. The audio data read in this manner is fed to a control 15. Control 15 in turn controls scanning device 20 with corresponding control commands. Moreover, control 15 is connected to a memory 30 and a decompression device 25. Memory 30 and decompression device 25 are connected to one another. Decompression device 25 is connected, both via a digital/analog converter 35 and directly, to an audio interface 40 of playback device 1, to which circuits or devices for further processing of the audio data read from audio CD 10 are connectable. This may, for example, be an acoustic playback device in the form of one or several amplifiers and one or several loudspeakers connected thereto. However, the audio data read may also be appropriately processed further in audio CD player 1 itself and these audio signals are reproducible on a playback arrangement of audio CD player 1, for example.

Audio interface 40 consequently includes a digital output 50, which is directly connected to decompression device 25, and an analog output 55, which is connected to decompression device 25 via digital/analog converter 35. Decompression device 25 may also be configured as a digital signal processor or as a part of such a digital signal processor.

Figure 2:
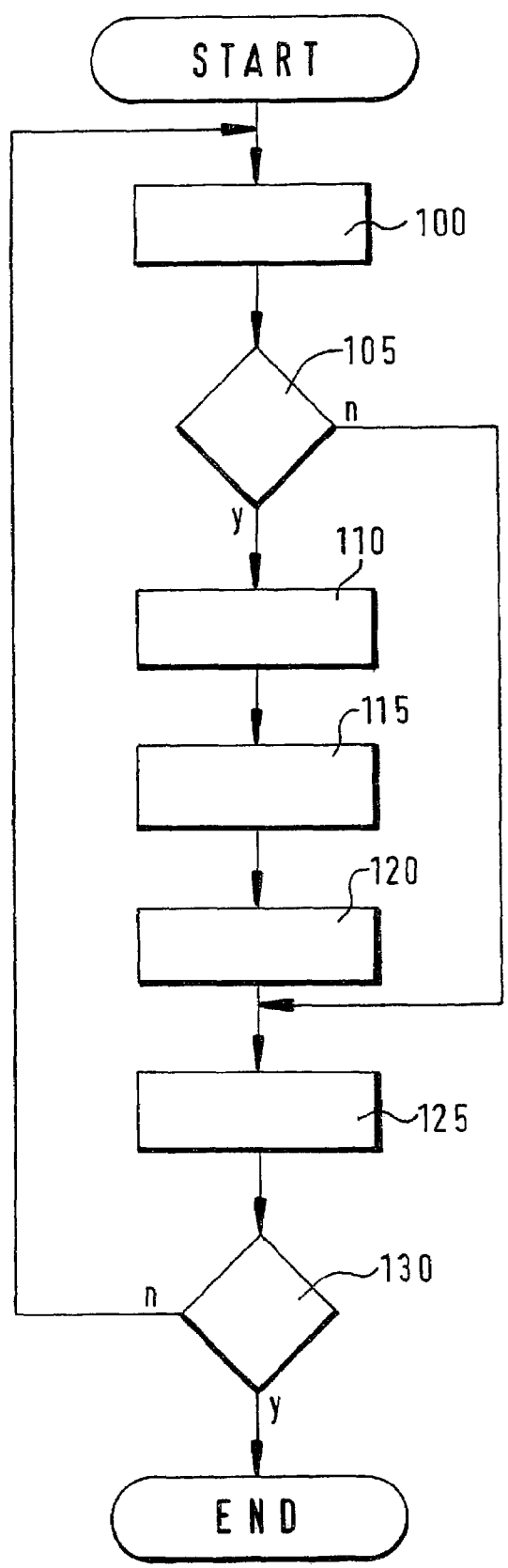
FIG. 2 illustrates a flow diagram for a control of the playback device according to the present invention.

A flow diagram for the operation of control 15 is illustrated in FIG. 2. At a program point 100, digital audio data stored on audio CD 10 inserted into drive 5 is read by scanning device 20 using laser beam 45 and relayed to control 15. Afterwards, the program branches off to point 105. At program point 105, control 15 checks whether the digital audio data read is compressed. If this is the case, the program branches off to point 110, otherwise, the program branches off to point 125. The audio data may be stored on audio CD 10 according to at least one compression method, for example according to the MP3 process (MPEG layer-3; MPEG=Motion Picture Expert Group). In this manner, more audio data may be saved on audio CD 10, with an unmodified, conventional storage density, than is possible without compression. In the MP3 format, for example, nine times as much data may be saved on audio CD 10 than without compression. Here, the various compression methods represent various types of compression. At program point 110, control 15 determines the type of the compression of the audio data read and reports this type of compression to decompression device 25 for selecting the decompression algorithm suitable for the decompression of this audio data. In the case of the compression according to the MP3 method, cited as an example, this method may occur either through analysis of the data format used for the compression or, in a much simpler fashion, through analysis of the file name extension used for the data stored on audio CD 10. In the case of the compression according to the MP3 method, this extension is "MP3", for example. The file name may additionally be displayed on a display device of audio CD player 1, and for instance, indicate a music title. Each music title on audio CD 10 could be stored here in file form with the corresponding file name. Afterwards, the program branches off to point 115, in which control 15 controls scanning device 20 in such a manner that it reads a specified audio data volume from audio CD 10, the audio data read is stored temporarily in memory 30. Here, for example, control 15 may control scanning device 20 such that it reads all the audio data of a data track of audio CD 10 and this audio data read may be stored temporarily afterwards in memory 30. Subsequently, the program branches off to point 120, in which decompression device 25 step-by-step requests the audio data stored in memory 30 through corresponding memory addressing, whereupon the addressed audio data is transferred by memory 30 to decompression device 25 and is decompressed there using the selected decompression algorithm. Afterwards, the program branches off to point 125. At program point 125, decompression device 25 hands over the decompressed audio data both to digital/analog converter 35 and directly to digital output 50 of audio interface 40. Digital/analog converter 35 converts the digitally decompressed audio data into analog audio data and hands it over to analog output 55 of audio interface 40. In the event that in program point 105 it is determined by control 15 that the audio data read is not compressed, the audio data read is transparently passed by control 15 through decompression device 25, i.e., no decompression algorithm is selected for decompression device 25, so that the audio data read is delivered either directly and in digital form to digital output 50, or after digital/analog conversion through digital analog converter 35, in analog form to analog output 55 at program point 125. Afterwards, the program branches off to point 130. At program point 130, control 15 checks whether all the audio data to be read was already read from audio CD 10. If this is the case, the program is exited; otherwise the program branches back to point 100.

At program point 130, control 15 checks in the case where the audio data is stored in a compressed manner on audio CD 10, whether all the audio data stored in memory 30 has already been decompressed by decompression device 25 and relayed to audio interface 40. Control 15 causes a new audio data volume, for example a new data track, to be read from audio CD 10 by scanning device 20 and relayed to memory 30 only when the audio data previously stored in memory 30 has been completely decompressed by decompression device 25 and relayed to audio interface 40. In this manner, data loss due to overflow of not yet decompressed audio data in memory 30 is prevented. Thus, control 15, depending on the processing status of the audio data that is currently in memory 30, specifies the times for the renewed reading of an audio data volume from audio CD 10 if compressed audio data is stored on audio CD 10. In the conventional case of uncompressed audio data stored on audio CD 10, reading in portions of the audio data stored on audio CD 10 is not necessary, however, since no temporary storage of this audio data in memory 30 and no decompression in decompression device 25 are necessary, such uncompressed audio data may be continuously read by scanning device 20 and relayed in the described manner to audio interface 40.

Audio data compressed according to various compression methods may be stored on audio CD 10. The types of compression used may be specified in this context in a lead-in area of audio CD 10 and collected there initially before control 15 starts reading the audio data. Here, the data tracks of audio CD 10 on which the audio data is compressed may be specified, along with the compression algorithm or compression method used. Here, data tracks or data sectors including compressed audio data as well as those including uncompressed audio data may also be provided on audio CD 10. Here, the uncompressed audio data is, as described, relayed in a transparent manner to audio interface 40 through decompression device 25. The amount of audio data of the compressed audio data to be stored in memory 30 may be selected by control 15 such that the corresponding audio data is all compressed according to the same compression method. Decompression device 25 may then use the same decompression algorithm or the same decompression method for the decompression of all audio data stored in memory 30. In storing audio data in memory 30, which is compressed according to various compression methods, control 15 controls decompression device 25 in such a manner that it decompresses the audio data stored in memory 30, each time using the correct decompression method. Since control 15 knows the data sectors of audio CD 10 in which the audio data is stored using the various compression methods, it may store the audio data of a given amount of audio data to be read by scanning device 20, depending on the compression method used, into differently addressed memory areas of memory 30 and inform decompression device 25 of the allocation of the decompression method to be used to these memory areas of memory 30, so that decompression device 25 may decompress the audio data stored in the various memory areas of memory 30 with the appropriately allocated decompression algorithm.

Finally, at digital output 50 and at analog output 55, the compression method used to compress the audio data relayed there or whether the audio data present on audio CD 10 is compressed at all is no longer known.

What is claimed is:

1. A playback device, comprising:
a drive for a storage medium;
a scanning device for reading audio data recorded on the storage medium when the storage medium is inserted into the drive;
a control device that checks whether the audio data read is compressed and that determines a type of compression of the audio data;
a decompression device that performs a decompression of the audio data if the audio data is compressed; and
a memory in which the control device stores the audio data of the storage medium read by the scanning device and detected as compressed, before the audio data is relayed to the decompression device;
wherein audio data read is stored in differently addressed memory areas of the memory depending on a compression method used, whereby a first type of audio data read that is compressed according to a first compression method is stored in a first addressed memory area of the memory, a second type of audio data read that is compressed according to a second compression method is stored in a second addressed memory area of the memory, and wherein the decompression device is informed of a first association between the first addressed memory area and the first compression method and a second association between the second addressed memory area and the second compression method, and wherein the decompression device decompresses the audio data stored in the first addressed memory area by using a first decompression method associated with first addressed memory area, and wherein the decompression device decompresses the audio data stored in the second addressed memory area by using a second decompression method associated with the second addressed memory area.

2. The playback device according to claim 1 wherein:
the control device, upon detecting that the audio data is compressed, causes the scanning device to read the audio data in portions from the storage medium.

3. The playback device according to claim 2 wherein:
the scanning device reads the audio data track by track from the storage medium.

4. The playback device according to claim 2 wherein:
the control device specifies times for reading in the portions of the audio data.

5. The playback device according to claim 1 wherein:
the control device feeds the audio data that is decompressed one of directly and via a digital/analog converter to an audio interface, for relaying to a playback apparatus.

6. The playback device according to claim 1 wherein:
the control device, upon detecting that the audio data of the scanned storage medium is uncompressed, feeds the audio data that is uncompressed one of directly and via a digital/analog converter to an audio interface, for relaying to a playback apparatus.

7. The playback device according to claim 1 wherein:
the decompression device includes a digital signal processor.

8. The playback device according to claim 1 wherein:
the memory includes a reference data area for storing information about which compression method is used to compress audio data stored in each addressed memory area.

* * * * *